United States Patent [19]
Balsarotti

[11] Patent Number: 5,979,230
[45] Date of Patent: Nov. 9, 1999

[54] BRAKE IN MOTION PLATE BRAKE TESTER AND METHOD

[75] Inventor: Steven C. Balsarotti, Crestwood, Mo.

[73] Assignee: Hunter Engineering Company, Bridgeton, Mo.

[21] Appl. No.: 08/858,983

[22] Filed: May 20, 1997

[51] Int. Cl.⁶ .................................................. G01L 5/28
[52] U.S. Cl. ................................................... 73/121
[58] Field of Search ............................. 73/121, 122, 123

[56] References Cited

U.S. PATENT DOCUMENTS

| | | | |
|---|---|---|---|
| 1,822,463 | 9/1931 | Taber | 73/122 |
| 1,831,198 | 11/1931 | Sandberg et al. | 73/122 |
| 2,011,238 | 8/1935 | Bouxin | 73/122 |
| 5,083,456 | 1/1992 | Colarelli, III . | |
| 5,129,260 | 7/1992 | Van Der Avoird | 73/122 |
| 5,230,242 | 7/1993 | Colarelli, III | 73/122 |
| 5,305,636 | 4/1994 | Balsarotti et al. . | |
| 5,379,636 | 1/1995 | Colarelli, III | 73/122 |

OTHER PUBLICATIONS

SAE Technical Papers Series "Road Transducer—Objective Brake Balance Measurement Without Vehicle Instrumentation" Michael J. Wolanin and Thomas A. Baptist—General Motors Corp. Feb. 23–27, 1987.

*Primary Examiner*—Eric S. McCall
*Attorney, Agent, or Firm*—Gregory F. Upchurch; Grant D. Kang; Michael T. Marrah

[57] ABSTRACT

A plate brake tester for testing the adequacy of the brakes of a vehicle includes first and second pairs of weight bearing plates, each sized to receive at least one wheel/tire assembly of a vehicle as a vehicle is driven over the plates. The first pair of plates are spaced from the second pair a predetermined distance along a predetermined direction of travel, which predetermined distance is substantially greater than the length of each plate as measured along the predetermined direction of travel. Sensors sense, for each plate, the brake force applied by a brake associated with the wheel/tire assembly passing over that plate and the dynamic weight of the wheel/tire assembly on each plate during braking. Control circuitry determines from the brake force and the directly sensed dynamic weight the adequacy of the brakes of the vehicle under test. Preferably, the first and second pairs of plates are approximately 30 feet apart along a test lane, and each plate is approximately 36" in length and 48" in width. Signals are provided to signal an operator to drive a vehicle onto the test lane, and to apply the brakes at a predetermined point along the test lane. It is preferred that the vehicle is decelerating as each wheel/tire assembly passes over at least some of the plates.

15 Claims, 4 Drawing Sheets

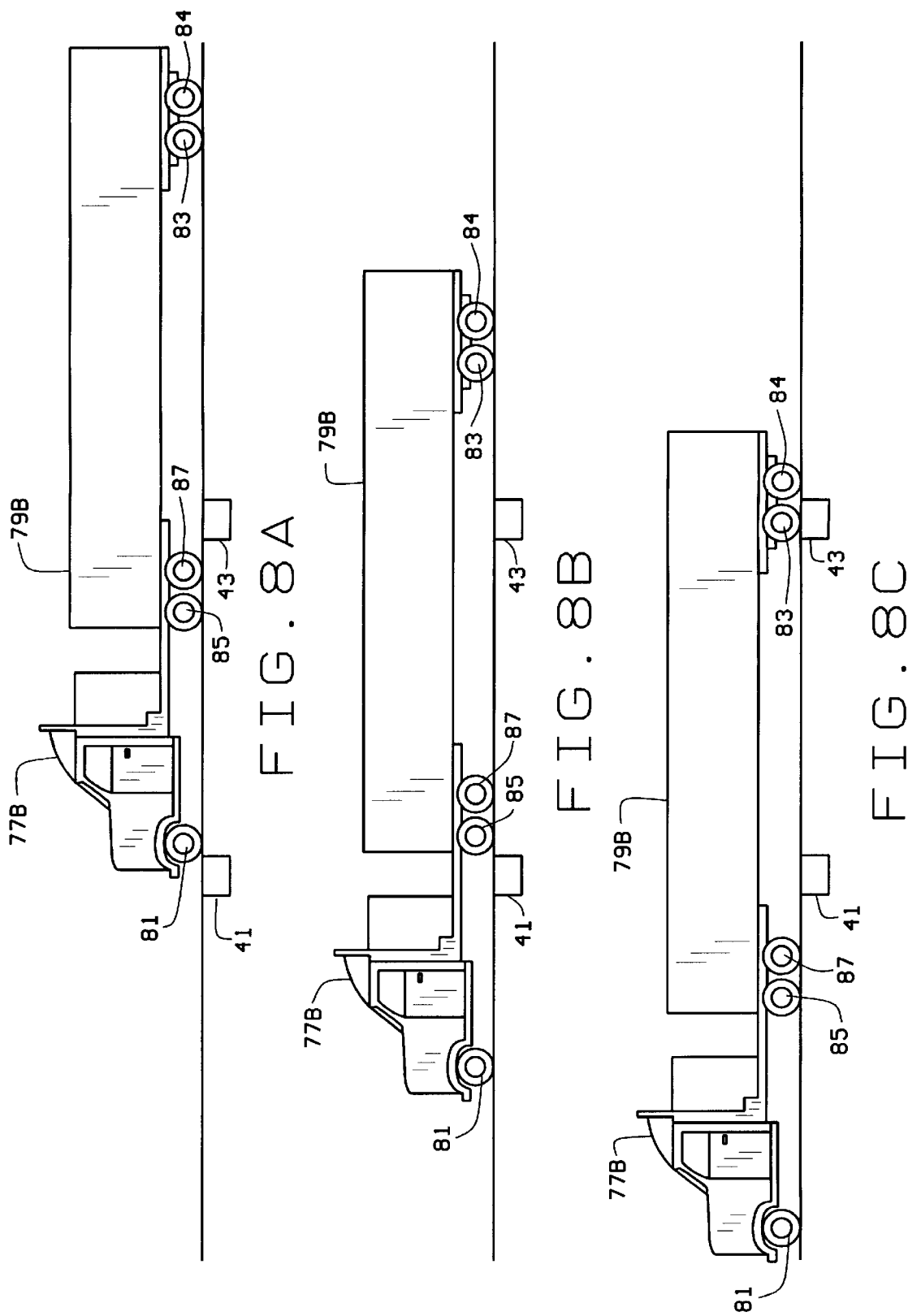

BRAKE IN MOTION PLATE BRAKE TESTER AND METHOD

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

This invention relates to brake testers for vehicles, and more particularly to plate brake testers particularly suited for testing the brakes of multi-axle vehicles.

Faulty or inadequate brakes are a significant cause of vehicle accidents. Moreover, the faulty condition of the brakes is often not apparent during routine use of the brakes. The operator of the vehicle is usually not aware, until it is too late, that the vehicle's brakes are deficient.

Furthermore, many brake defects are not readily apparent during a visual inspection of the brakes. Only a test simulating actual stopping conditions can detect many brake defects.

When the brakes of a vehicle are applied, a retarding force is generated between the tire and the surface on which the tire is riding. When this force becomes greater than the weight on that wheel multiplied by the coefficient of friction between the tire and the surface, the wheel will begin to lock up and stop rolling. The retarding force of a wheel just before lockup is greater than the retarding force of the same wheel just after lockup. In addition, a locked wheel loses its ability to maintain lateral forces, which makes handling very difficult.

Since the maximum usable force of a brake is related to the weight on that wheel, vehicle designers adjust the braking system so that the brake force distributions coincide with the vehicle weight distribution. When a vehicle is decelerating, the forces acting on the center of gravity of the vehicle cause a weight shift. The "dynamic weight" appearing on each wheel/tire assembly is, therefore, different from the "static weight" when the vehicle is at rest.

Apparatus for testing brake performance are available, but they could be improved. For example, the results of the brake test under actual stopping conditions can depend upon the make and model of the vehicle, the actual deceleration applied to the vehicle during the test, and the static and dynamic weight distribution of the vehicle during the test. Apparatus which would take into account all these factors have heretofore been considered too complicated or too slow.

U.S. Pat. No. 5,083,456, assigned to the assignee of the present application, addresses many of these drawbacks, in part by estimating the dynamic weight distribution of the vehicle under test. Although this works extremely well for automobiles, it is less satisfactory for multi-axle vehicles such as tractor-trailer trucks where such estimation is more difficult and less accurate.

With respect to trucks, truck loading makes a significant difference in the apparent acceptability of brakes. A fully loaded truck responds very differently than a lightly loaded one. A test designed for fully loaded trucks can, therefore, fail to accurately indicate the actual condition of the brakes when the truck is tested during light load conditions.

Many of these difficulties are addressed in U.S. Pat. No. 5,305,636, also assigned to the assignee of the present application. However, even the apparatus disclosed in that patent could be improved. For example, with the '636 apparatus, testing of a five-axle vehicle requires multiple stops. If the testing procedure is performed correctly with that apparatus, the driver (operator) of a five-axle vehicle must make three stops and back up at least once. If a stop is missed or made incorrectly, additional backing up is required to repeat a test. Before a test is performed with the '636 apparatus, detailed drive instruction is required. Different drivers have different abilities and/or reaction times, so that this type of test can be difficult for some drivers. The disclosure of the '636 patent is hereby incorporated by reference.

BRIEF SUMMARY OF THE INVENTION

Among the various objects and features of the present invention may be noted the provision of an improved system for testing vehicle brakes.

Another object is the provision of such a system which provides quick and accurate testing of vehicle brakes.

A further object is the provision of such a system which requires only a single stop.

A fourth object is the provision of such a system which does not require the drive/operator to back up the vehicle.

A fifth object is the provision of such a system which is particularly suited for multi-axle trucks.

A sixth object is the provision of such a system which requires little or no driver instruction.

A seventh object is the provision of such a system which does not require exceptional skill on the part of the driver.

An eighth object is the provision of such a system which accommodates a wide range of vehicle axle configurations with a single brake application.

A ninth object is the provision of such a system which requires only the constant application of brake pressure during the test.

A tenth object is the provision of such a system in which lockup of the vehicle wheels is avoided because a complete stop of the vehicle is not made until the tester is completely crossed.

An eleventh object is the provision of such a system with improved total test time.

A twelfth object is the provision of such a system which requires neither a precisely defined vehicle speed nor a precise vehicle stopping location.

Other objects and features will be in part apparent and in part pointed out hereinafter.

Briefly, a plate brake tester of the present invention includes at least a first pair of weight bearing plates and a second pair of weight bearing plates, each weight bearing plate being suitably sized to receive thereon at least one wheel/tire assembly of a vehicle as a vehicle is driven over the plates. The plates of each pair are substantially parallel to each other, the first pair of weight bearing plates being spaced from the second pair of weight bearing plates a predetermined distance along a predetermined direction of travel. The predetermined distance is substantially greater than the length of each plate as measured along the predetermined direction of travel. Sensors are provided for sensing, for each plate, the brake force applied by a brake associated with the wheel/tire assembly passing over that plate and for sensing the dynamic weight of the wheel/tire assembly on each plate during braking. Control circuitry operatively connected to the sensors determines from the brake force and the directly sensed dynamic weight the adequacy of the brakes of the vehicle under test.

A method of the present invention for testing the adequacy of the brakes of a vehicle includes the steps of driving a vehicle down a test lane in which are disposed first and second pairs of weight bearing plates, the first and second pairs of weight bearing plates being separated along the test lane a predetermined distance which is substantially greater than the nominal diameter of the vehicle wheels, applying brakes of the vehicle to decelerate the vehicle as wheels of the vehicle are passing over the weight bearing plates, sensing the brake force applied by the brakes and the dynamic weight of the vehicle by sensors associated with the weight bearing plates, and determining the adequacy of the brakes of the vehicle under test from the brake force and the dynamic weight.

BRIEF DESCRIPTION OF THE SEVERAL VIEW OF THE DRAWINGS

FIGS. 6–8 are simplified elevational views illustrating the operation of the brake tester of the present invention.

Similar reference characters indicate similar parts throughout the several views of the drawings.

DETAILED DESCRIPTION OF THE INVENTION

Figure 1:
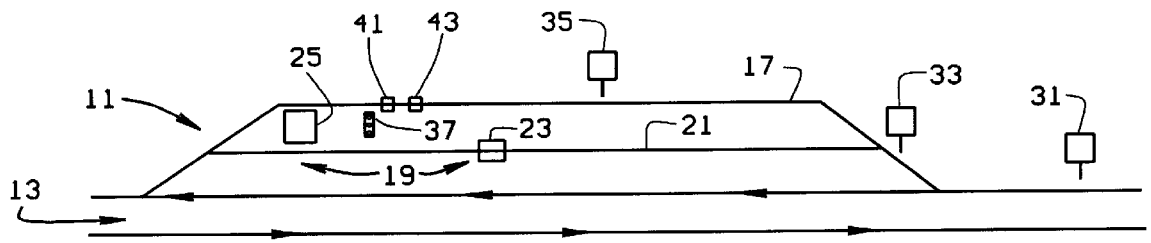
FIG. 1 is a schematic of the brake tester of the present invention is use in combination with a conventional truck weigh station.

Turning now to FIG. 1, a brake-in-motion plate brake testing system 11 of the present invention is shown. By brake-in-motion is meant that the testing of the brakes are done while the vehicle is in motion, not coming to a complete stop until after all the brakes are tested. It is preferred that the brakes of a vehicle under test be tested as the vehicle is decelerating from a speed of 30 mph or greater. As will become apparent, such an initial speed is selected to ensure that the last axle to be tested passes over one of the measuring plates (described below) before the vehicle comes to a full stop.

As shown in FIG. 1, it is preferred that the brake testing system be located in close proximity to a highway 13. Multi-axle trucks can easily weigh 80,000 pounds or so, and thus cannot be accelerated to the desired initial speed of 30 mph over short distances. Rather, by disposing the testing system adjacent a highway as shown in FIG. 1, the vehicle can be diverted onto the test lane of the system while it is still up to speed. As indicated in FIG. 1, system 11 can be readily implemented on an additional lane 17 of a conventional truck weight scale station 19. As is well known, such stations include a weight lane 21 in which is embedded a weight scale 23 (enlarged in FIG. 1 for clarity), and an inspector's station 25.

System 11 when implemented in such a combination with a weight station would include a first sign 31 disposed adjacent the highway 13 which would instruct the driver/ operators that the weigh scale and brake test were ahead, and that they should exit. Adjacent the intersection of lanes 17 and 21, a second sign 33 instructs the driver/operators to enter either lane 17 (for brake testing) or lane 21 (for weighing). Sign 33 is under the control of the inspector in the inspector's station and is operated so that only one truck at a time is in the brake test lane 17. Upon entering lane 17, the driver sees a third sign 35 which instructs him or her to maintain the desired speed (30 mph, for example) and to brake at constant pressure when a red stop light 37 comes on. It is preferred that the constant deceleration be approximately 0.30 g, although the present system operates well over a wide range of decelerations.

By following these simple instructions, the driver causes the vehicle to decelerate from 30 mph while passing over a first and second pair of measuring plates 41, 43 before coming to a complete stop in the vicinity of the inspector's station. It is desired that the vehicle be required to come to a complete stop after crossing completely over the test plates so that the inspector can discuss problems with the driver or direct that the vehicle be sidelined for repairs. In those cases where the amount of deceleration cannot be measured other than by a static weighing, the vehicle can be backed over the front pair of measuring plates 41 to determine the static weight.

Figure 2:
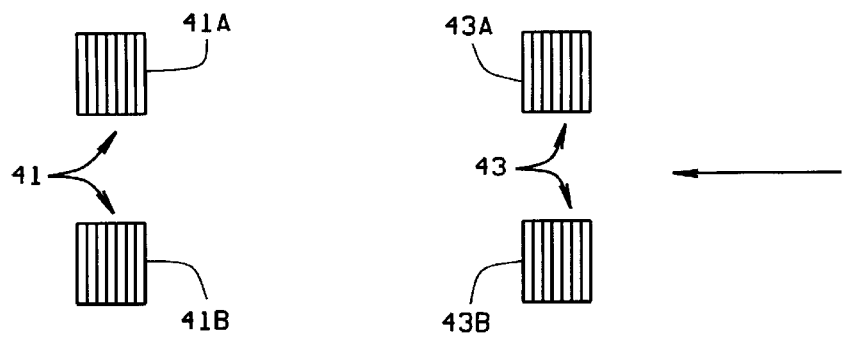
FIG. 2 is a top plan view of measuring plates used in the present invention, showing their relative placement with respect to the direction of travel of the vehicle under test.

Referring to FIG. 2, measuring plate pair 41 is seen to be composed of two measuring plates 41A and 41B disposed parallel to each other perpendicularly to the line of travel. Measuring plate pair 43 is similarly composed of two measuring plates 43A and 43B. The spacing between measuring plates of a pair is approximately two feet, while the center-to-center spacing of the pairs themselves is approximately 30 feet. Each plate has associated therewith a dual axis load cell for measuring braking force and dynamic weight. Such load cells and their connection to their respective plates is discussed in detail in the aforementioned U.S. Pat. No. 5,305,636.

Figure 3:
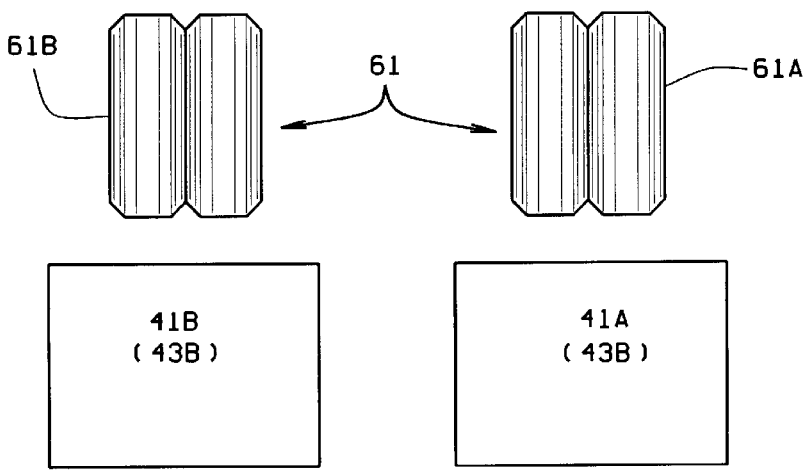
FIG. 3 is a top plan view of one set of measuring plates such as those shown in FIG. 2, in combination with a wheel/tire assembly, illustrating the relative dimensions.
Figure 4:
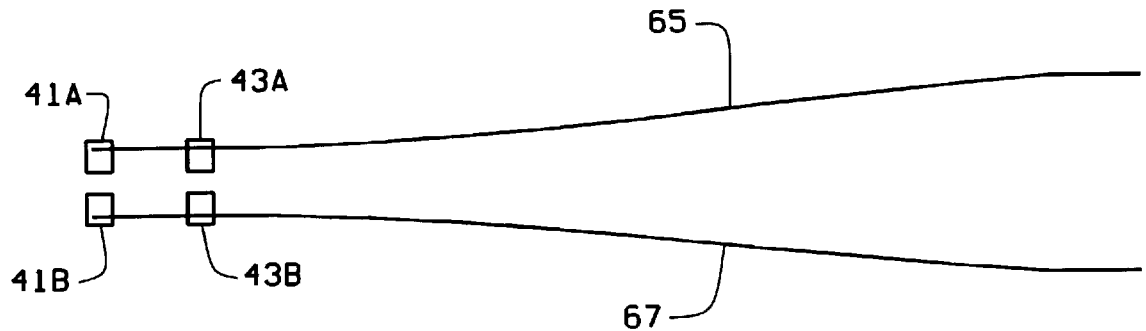
FIG. 4 is a simplified schematic from the air of the measuring plates of the brake tester of the present invention, in combination with guide lines for aiding the driver of the vehicle.

Turning to FIG. 3, the dimensions of each pair of measuring plates are illustrated with reference to a standard wheel/tire assembly configuration 61. Assembly 61 has a standard center-to-center spacing of six feet, and dual-tire width on each side of 21.5". The dimensions of each pair of measuring plates are selected to ensure that one set of tires 61A crosses over measuring plate 41A (and 43A), while the other set of tires 61B crosses over measuring plate 41B (and 43B) during the test. The plates are preferably approximately four feet wide and three feet long, each plate being separated from the other plate of its pair by approximately two feet. The plates are wider than they are long to compensate in part for the relatively fast speeds at which the vehicle will approach the plates (to give the driver a larger target at the relatively high speed). The plates are deliberately only three feet long so that one axle of a tandem pair is completely off a plate before the second axle comes onto the plate. To further assist the driver, the test lane 17 may be marked with highly visible (e.g., yellow) guide lines 65, 67 which converge as they approach measuring plate pairs 41, 43.

Figure 5:
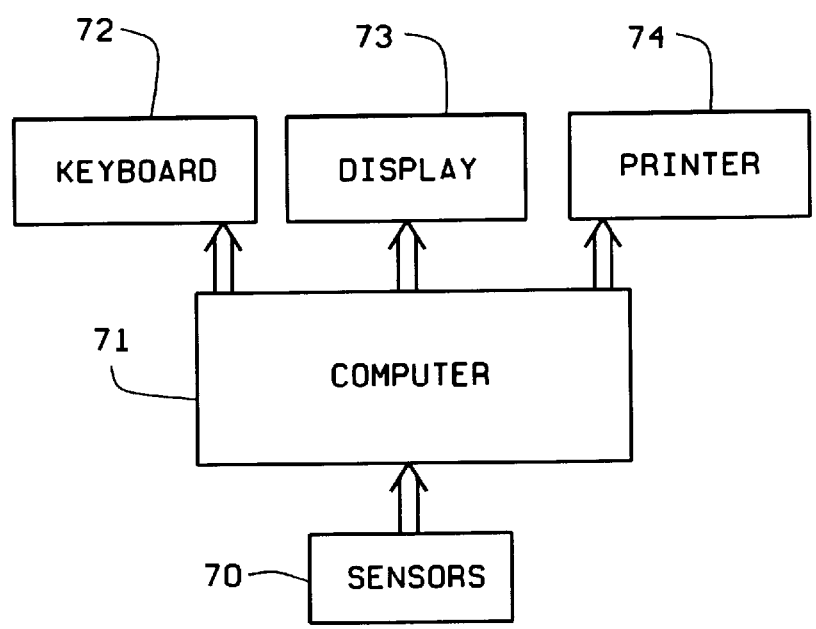
FIG. 5 is a block diagram of electronic components of the brake tester of the present invention.

The signals from the load cell sensors, labeled 70, are supplied to a computer 71 (see FIG. 5) in the manner described in the U.S. Pat. No. 5,305,636. The computer may, in the conventional manner have associated therewith a keyboard 72, a display 73, and/or a printer 74. The computer determines braking characteristics of each axle from the sensor inputs, again as described in the U.S. Pat. No. 5,305,636.

Figure 6A:
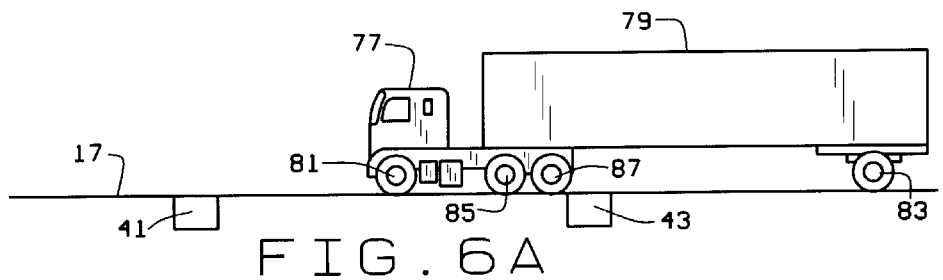
Figure 6B:
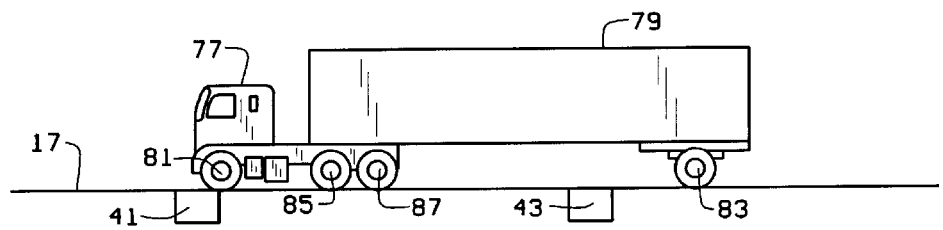
Figure 6C:
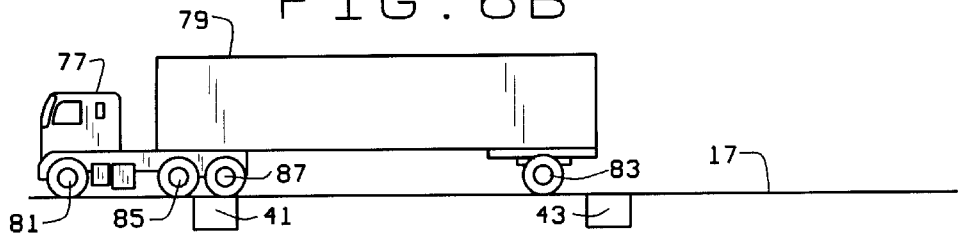
Figure 7A:
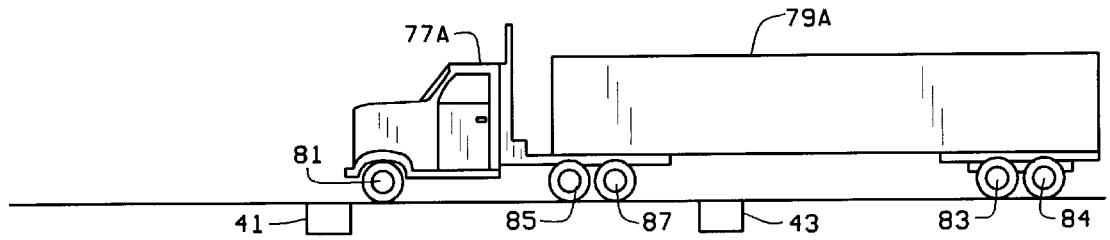
Figure 7B:
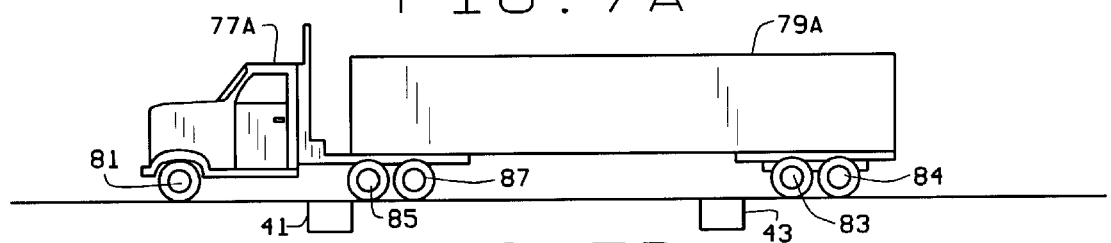
Figure 7C:
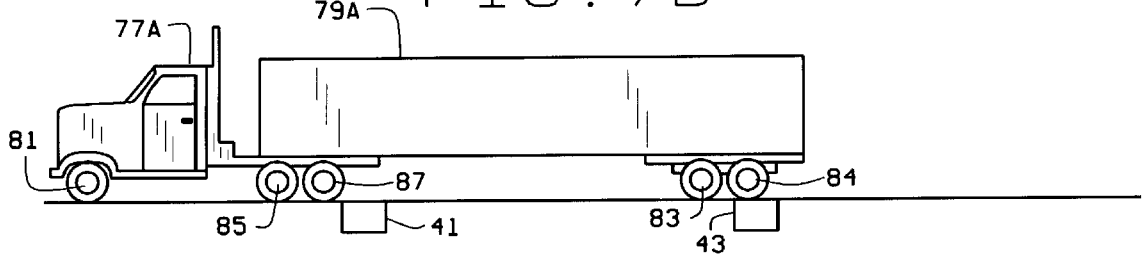

A significant difference between the U.S. Pat. No. 5,305,636 and the present invention is illustrated by FIGS. 6–8. FIG. 6 illustrates the order of testing of the brakes on a vehicle having a 120" tandem tractor 77 with a 32' single axle trailer 79. In all the examples, the "A" figure of FIGS. 6–8 is the first in time, followed by the "B" figure, with the "C" figure being the latest in time. In the example of FIG. 6, as illustrated by FIGS. 6A–6C, the steer axle 81 is tested first (which test is performed on the front plate pair 41), the trailer axle 83 is tested second (which test is performed on the rear plate pair 43), the first drive axle 85 is then tested (on the front plate pair 41), and finally the second drive axle 87 is tested (on the front plate pair 41). The velocity when the last axle to be tested crosses the front plate, assuming a deceleration of 0.3 g is approximately 27 mph.

The example of FIG. 7 shows a 188" tandem tractor 77A with a 45' trailer 79A. In this example, the steer axle 81 is tested first (on the front plate pair), the first drive axle 85 is tested second (on the front plate pair), the first trailer axle 83 is tested third (on the rear plate pair), the second drive axle 87 is tested fourth (on the front plate pair), and the second trailer axle 84 is tested last (on the rear plate pair). Under similar conditions, the velocity of the vehicle when the last axle to be tested crosses the corresponding plate (in this case the rear plate pair) is approximately 25 mph.

In FIG. 8, a 260" tandem tractor 77B with a 53' tandem trailer 79B is tested. In this example, the steer axle 81 is tested first (on the front plate pair), the first drive axle 85 is tested second (on the front plate pair), the second drive axle is tested third (on the front plate pair), the first trailer axle 83 is tested fourth (on the front plate pair), and the second trailer axle 84 is tested last (on the rear plate pair). The approximate velocity of the vehicle when the last axle to be tested crosses the corresponding plate (in this case the rear plate pair) is approximately 22 mph.

It should be noted from the final speeds indicated above, that the driver need not in fact be driving at least at 30 mph when the test is initiated to ensure that the vehicle is still decelerating when the last test is completed. The spacing of the pairs of plates provides a great tolerance on the initial speed of the vehicle.

From the examples themselves it can be seen that the present system operates independently of the particular order in which the axles are tested, while at the same time ensuring that all axles are tested accurately and in a relatively short period of time.

In view of the above, it will be seen that all the objects and features of the present invention are achieved, and other advantageous results obtained. The description of the invention contained herein is illustrative only, and is not intended in a limiting sense.

I claim:

1. A plate brake tester for testing braking characteristics of brakes of a vehicle having brakes comprising:

at least a first pair of weight bearing plates and a second pair of weight bearing plates, each weight bearing plate being suitably sized to receive thereon at least one wheel/tire assembly of a vehicle as a vehicle is driven over the plates, the plates of each pair being substantially parallel to each other, said first pair of weight bearing plates being spaced from the second pair of weight bearing plates a predetermined distance along a predetermined direction of travel, said predetermined distance being approximately thirty feet;

sensors for sensing, for each plate, a brake force applied by a brake associated with the wheel/tire assembly passing over said plate and for sensing the dynamic weight of the wheel/tire assembly on each plate during braking; and control circuitry operatively connected to the sensors for determining from the brake force and the sensed dynamic weight braking characteristics of the brakes of the vehicle under test.

2. The plate brake tester as set forth in claim 1 wherein the sensors include at least one load cell for each plate.

3. The plate brake tester as set forth in claim 1 wherein the length of said plates, measured along the direction of travel, is approximately 36".

4. The plate brake tester as set forth in claim 1 wherein each weight bearing plate has a width, measured perpendicularly to the direction of travel, which exceeds the length of said plate.

5. The plate brake tester as set forth in claim 4 wherein said width is approximately 48".

6. The plate brake tester as set forth in claim 1 wherein the plates are all disposed on a test lane, further including means for signalling to an operator to drive a vehicle onto the test lane.

7. The plate brake tester as set forth in claim 6 wherein the signalling means is manually controlled.

8. The plate brake tester as set forth in claim 6 further including visual means for signalling the operator to apply the brakes of the vehicle.

9. The plate brake tester as set forth in claim 8 wherein the visual means are operable in response to detection of the presence of the vehicle at a predetermined position along the test lane.

10. The plate brake tester as set forth in claim 6 wherein the vehicle is a multi-axle truck and the test lane is sufficiently long to allow the truck to decelerate from approximately 30 mph to a stop, the plates being disposed along the test lane such that the truck is decelerating as each wheel/tire assembly passes over at least some of the plates.

11. A method of testing braking characteristics of brakes of a vehicle having brakes, comprising the steps of:

driving a vehicle down a test lane in which are disposed first and second pairs of weight bearing plates, said first and second pairs of weight bearing plates being separated along the test lane a predetermined distance which is substantially greater than twenty feet;

applying brakes of the vehicle to decelerate the vehicle as wheels of the vehicle are passing over the weight bearing plates;

sensing a brake force applied by the brakes and the dynamic weight of the vehicle by sensors associated with said weight bearing plates; and determining braking characteristics of the brakes of the vehicle under test from the brake force and the dynamic weight.

12. A method of testing braking characteristics of brakes of a vehicle having brakes, comprising the steps of:

driving a vehicle down a test lane in which are disposed first and second pairs of weight bearing plates, said first and second pairs of weight bearing plates being separated along the test lane a predetermined distance which is substantially greater than the nominal diameter of the vehicle wheels;

applying brakes of the vehicle to decelerate the vehicle as wheels of the vehicle are passing over the weight bearing plates;

sensing a brake force applied by the brakes and the dynamic weight of the vehicle by sensors associated with said weight bearing plates; and determining braking characteristics of the brakes of the vehicle under test from the brake force and the dynamic weight;

wherein the first and second pairs of weight bearing plates are separated along the test lane a distance of approximately thirty feet.

13. The method as set forth in claim 11 further including the step of visually directing an operator of the vehicle to drive the vehicle along the test lane.

14. The method as set forth in claim 13 further including the step of visually directing said operator to apply the brakes as the vehicle approaches a predetermined point along the test lane.

15. A plate brake tester for testing braking characteristics of brakes of a vehicle having brakes comprising:

at least a first pair of weight bearing plates and a second pair of weight bearing plates, each weight bearing plate being suitably sized to receive thereon at least one wheel/tire assembly of a vehicle as a vehicle is driven over the plates, the plates of each pair being substantially parallel to each other, said first pair of weight bearing plates being spaced from the second pair of weight bearing plates a predetermined distance along a predetermined direction of travel, said predetermined distance being greater than twenty feet;

sensors for sensing, for each plate, a brake force applied by a brake associated with the wheel/tire assembly passing over said plate and for sensing the dynamic weight of the wheel/tire assembly on each plate during braking; and control circuitry operatively connected to the sensors for determining from the brake force and the sensed dynamic weight braking characteristics of the brakes of the vehicle under test.

* * * * *